United States Patent [19]

Lee

[11] Patent Number: 5,155,640
[45] Date of Patent: Oct. 13, 1992

[54] DISK SPINDLE MOTOR CAP

[75] Inventor: Yu-Chuan Lee, Cupertino, Calif.

[73] Assignee: Microscience International Corp., San Jose, Calif.

[21] Appl. No.: 518,599

[22] Filed: May 3, 1990

[51] Int. Cl.[5] .................... E21B 33/00; B65D 53/06; G11B 17/08; F16C 33/74

[52] U.S. Cl. .............................. 360/98.07; 360/99.08; 277/80; 277/135; 384/133

[58] Field of Search ................. 277/80, 135; 384/446, 384/447, 133, 446, 477; 360/97.03, 98.07, 99.08

[56] References Cited

U.S. PATENT DOCUMENTS

| | | | |
|---|---|---|---|
| 4,673,997 | 6/1987 | Gowda et al. | 277/80 |
| 4,777,549 | 10/1988 | Dushkes et al. | 360/97.03 |
| 4,900,042 | 2/1990 | Genda | 384/477 |
| 4,922,406 | 5/1990 | Schuh | 360/97.03 |
| 4,995,622 | 2/1991 | Fuse | 277/80 |
| 4,996,613 | 2/1991 | Hishida | 360/99.08 |
| 5,001,581 | 3/1991 | Elsasser et al. | 360/99.08 |
| 5,009,436 | 4/1991 | Endo et al. | 277/135 |
| 5,011,165 | 4/1991 | Cap | 277/80 |

Primary Examiner—A. J. Heinz
Assistant Examiner—Jefferson Evans
Attorney, Agent, or Firm—Townsend and Townsend

[57] ABSTRACT

The present invention is a disk spindle motor cap. By affixing the cap to the cylindrical shaft of a disk drive, the amount of magnetic ferrofluid escaping from the well between the hub and the cylindrical shaft of the disk spindle assembly is reduced.

2 Claims, 2 Drawing Sheets

DISK SPINDLE MOTOR CAP

The present invention relates generally to disk drive assemblies. More particularly, the invention relates to retaining magnetic ferrofluid within a well in a disk drive spindle motor assembly.

BACKGROUND OF THE INVENTION

Disk drive spindle assemblies are built around a cylindrical shaft including electromagnetic windings for writing data on a disk. The cylindrical shaft is encircled with a hub, upon which a disk is held in a disk drive. As the hub spins about the cylindrical shaft, the disk spins with it. Between the hub and the shaft are positioned a set of ball bearings which permit the hub to move smoothly about the shaft. The well or opening formed between the shaft and the hub at each end, includes a ball bearing and is filled with lubricant. In the prior art, particles from the ball bearings would escape from bearing casing and end up on a disk or in other components of the drive assembly. This problem was reduced by the addition of a ferrofluid seal assembly made of magnetic ferrofluid and magnetic pole pieces positioned near the opening of each end. The magnetic ferrofluid is held in the well by magnets attached to the shaft. The magnetic ferrofluid prevents particles from escaping through a gap at the top between the hub and the shaft.

A problem that exists with the present design of the magnetic seal is that the magnetic seal is placed at the top of the motor where it is exposed to the environment. When the temperature rises and air pressure changes during normal operation of the disk drive, the ferrofluid evaporates into the nearby surroundings. In addition, the ferrofluid may splash out of the well between the seal and the shaft as the hub spins about the shaft. Evaporation, splashing or migration of the ferrofluid results in the deposition of particles or films on the disk surface and between the disk and the magnetic head interface. Further, sticktion problems result preventing the motor from starting and causing errors during normal read/write operations. In the worst case the heads may crash.

SUMMARY OF THE INVENTION

The present invention is a disk spindle motor cap for preventing magnetic ferrofluid from escaping from the well between the cylindrical shaft and the hub of a disk drive assembly. The cap is positioned at the top of the cylindrical shaft in a recess formed by the hub where it extends beyond the top of the cylindrical shaft. As the hub spins around the shaft and the cap, the pressure builds between the cap and the magnetic seal preventing the ferrofluid from escaping from the well and into the outside environment. Evaporation, migration and splashing are reduced, resulting in improved operation and reliability.

The cap prevents the escape of fluid and particles from the well for two reasons. First, it directly covers the openly leaving only a small gap through which fluid and particles can escape. Second, it is believed that the cap creates a buildup of pressure at the top of the well which forces fluid and particles to stay in the well. This conclusion is drawn from the fact that when the cap is removed it is not found to contain noticeable deposits on its underside.

In a preferred environment, the cap is a disk shaped device having a downward projecting ring at its periphery extending to a point just above the magnetic seal encircling the shaft. The cap is affixed to the top of the spindle assembly. As the hub spins around the shaft and the cap, pressure builds up within the gap formed between the ring and the shaft holding the ferrofluid in the well between the shaft and the hub.

The advantages achieved by the use of the disk spindle motor cap are numerous. First, the magnetic ferrofluid is held in the well and prevented from escaping into the other components of the disk drive. This results in the ferrofluid and contaminants contained therein being prevented from damaging other parts of the disk drive.

Another advantage achieved by the present invention is associated with the reduced evaporation of magnetic ferrofluid from the well. Reduced evaporation means a longer service life time of magnetic ferrofluid.

A further advantage of the present invention is improved operation of the disk drive with a reduced chance of errors, since ferrofluid will be less likely to leak to components of the disk drive assembly where it should not be present. In addition, disk drive failure occurs less frequently.

For a more complete understanding of the nature and advantages of the invention, reference should be made to the ensuing detailed description taken in conjunction with the accompanying drawings.

DESCRIPTION OF THE PREFERRED EMBODIMENT

Figure 1:
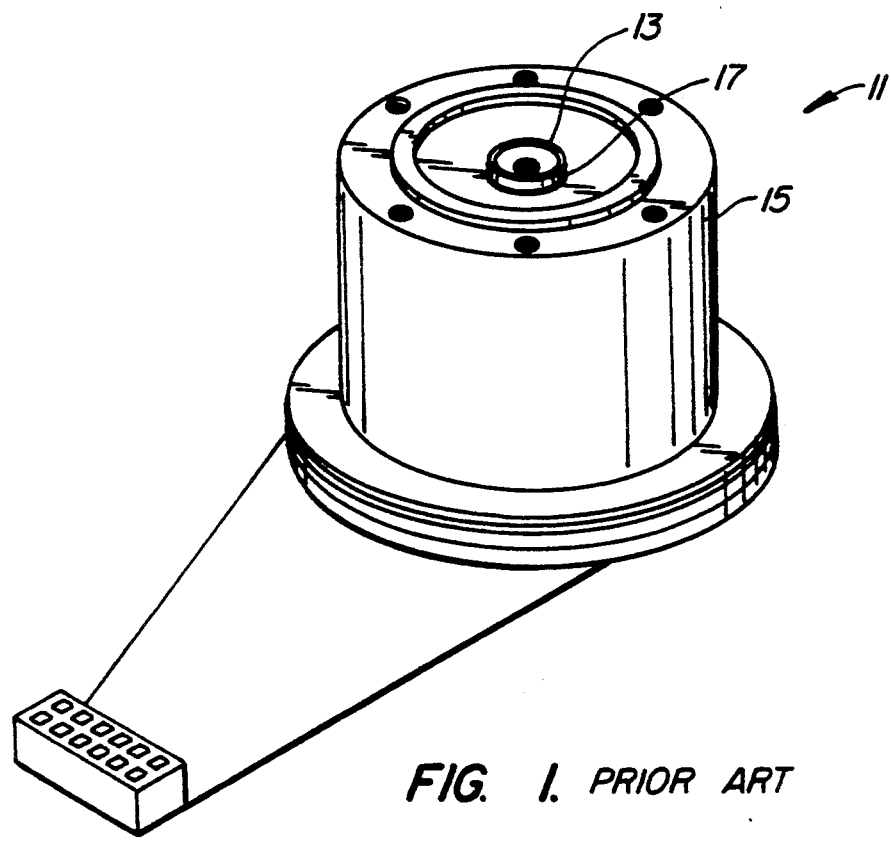
FIG. 1 is a diagram illustrating a spindle assembly in accordance with the prior art.

FIG. 1 is a diagram illustrating a disk spindle assembly 11 in accordance with the prior art. Spindle assembly 11 contains a cylindrical shaft 13 encircled by a hub 15, upon which a memory disk is mounted. Between cylindrical shaft 13 and hub 15 is a well 17, within which a plurality of ball bearings is located and which provides the mechanics by which hub 15 spins about cylindrical shaft 13. Also within hub 15 is located a magnetic seal for holding a magnetic ferrofluid in well 17.

Figure 2:
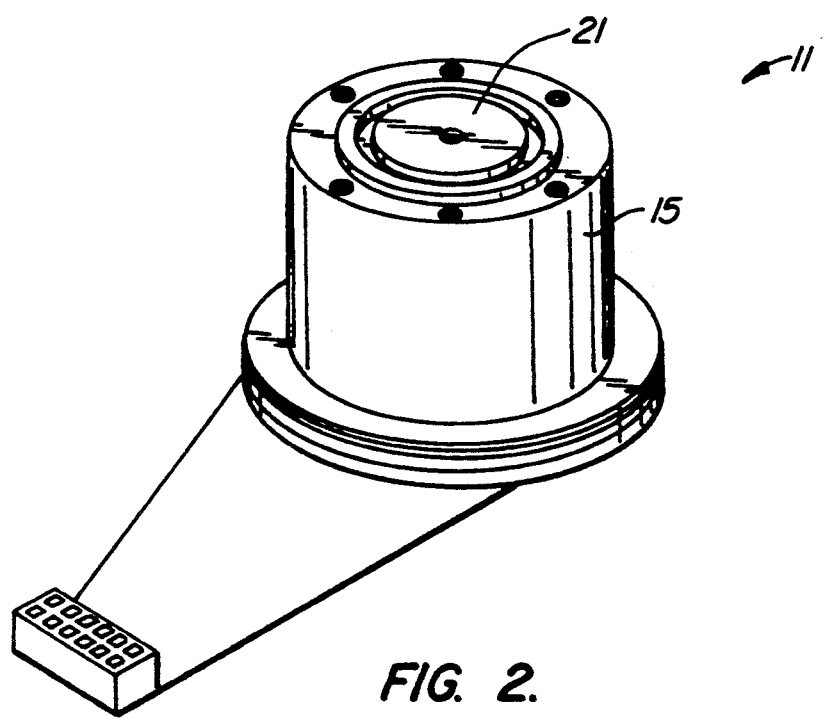
FIG. 2 is a diagram illustrating the spindle assembly of FIG. 1 with a disk spindle motor cap.

FIG. 2 is a diagram illustrating a spindle assembly in accordance with the present invention. Cylindrical shaft 13 (not shown) is covered by disk spindle motor cap 21, which prevents the magnetic ferrofluid from escaping from well 17.

Figure 3:
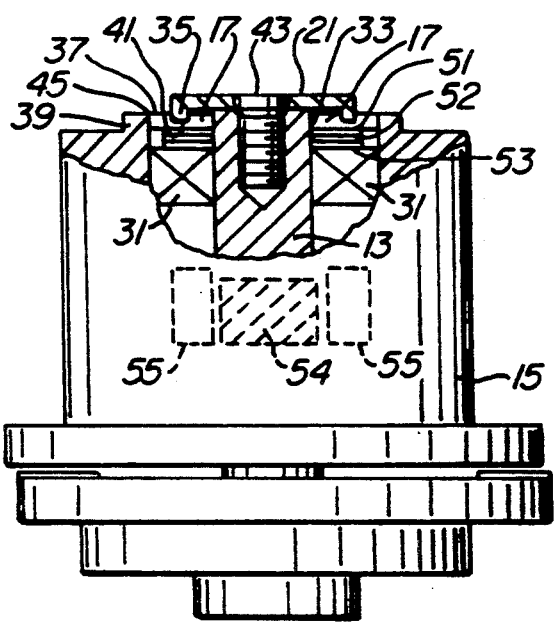
FIG. 3 is a diagram showing a cutaway side view of the spindle assembly and disk spindle motor cap of FIG. 2.

FIG. 3 is a diagram illustrating a cutaway side view of the spindle assembly of FIG. 2. Cap 21 is affixed to the top of cylindrical shaft 13. Well 17 is formed around cylindrical shaft 13 between hub 15 and cylindrical shaft 13. Hub 15 includes an upwardly extending ring 39 which extends beyond the lower edge 41 of downwardly projecting ring 35 of cap 21. In a preferred embodiment, an upper surface 43 of cap 21 is above an upper surface 45 of upwardly extending ring 39.

A plurality of ball bearings 31 are positioned in well 17 and permit hub 15 to rotate about cylindrical shaft 13. Magnetic ferrofluid seal 33 is also situated in well 17. Ring-shaped hole pieces 51 and 53 and ring-shaped magnet 52 keep magnetic ferrofluid from migrating upward. However, some of the magnetic ferrofluid does leak upward and is prevented from escaping by disk spindle motor cap 21. Electromagnetic windings 54 are attached to shaft 13 and interact with magnets 55 on hub 15 to cause rotation of hub 15 above the ball bearings.

In operation, hub 15 rotates on ball bearings 31 about cylindrical shaft 13. As rotation occurs, magnetic ferrofluid begins to migrate upward. Because of the shape of cap 21 formed with downward projecting ring 35, a pressure buildup of air occurs under cap 21 and prevents ferrofluid from escaping through well opening 37. The width of well opening 37 is preferably less than the width of downwardly projecting ring 35.

In general, to those skilled in the art to which this invention relates, many changes in construction and widely differing embodiments in applications of the present invention will suggest themselves without departing from it in spirit and scope. For instance, the dimensions of disk spindle motor cap 21 can be adjusted to accommodate various types of spindle assemblies. Thus, the disclosures and descriptions herein are purely illustrative and are not intended to be in any sense limiting. The scope of the invention is set forth in the appended claims.

What is claimed is:

1. A disk drive spindle assembly comprising:
   a cylindrical shaft having a top and a bottom with attached electromagnetic windings situated between said top and said bottom;
   a hub having a top and a bottom, said hub encircling said shaft for supporting at least one memory disk and having magnets for interacting with said electromagnetic windings to cause rotation of said hub about said shaft when an appropriate current is applied to said electromagnetic windings;
   a plurality of ball bearings arranged between said shaft and said hub;
   a cap coupled to said top of said cylindrical shaft having a disk shape and a downwardly projecting peripheral ring forming an air gap between said ring and an outer surface of said shaft;
   a magnetic fluid seal arranged between said shaft and said hub adjacent said plurality of ball bearings;
   said hub further comprising an upwardly extending ring at its periphery such that said upwardly extending ring extends to substantially the same level as said top of said cylindrical shaft;
   wherein said cap is positioned relative to said upwardly extending ring such that a gap is created between an outer surface of said cap and an inner surface of said upwardly extending ring.

2. A disk drive spindle assembly comprising:
   a cylindrical shaft having a top and a bottom with attached electromagnetic windings situated between said top and said bottom;
   a hub having a top and a bottom, said hub encircling said shaft for supporting at least one memory disk and having magnets for interacting with said electromagnetic windings to cause rotation of said hub about said shaft when an appropriate current is applied to said electromagnetic windings, said hub having an upwardly extending ring at its periphery such that said upwardly extending ring extends to substantially the same level as said top of said cylindrical shaft,
   a plurality of ball bearings arranged between said shaft and said hub; and
   a cap coupled to said top of said cylindrical shaft having a disk shape and a downwardly projecting peripheral ring forming a first air gap between said ring and an outer surface of said shaft, said cap being positioned relative to said upwardly extending ring such that a second gap is created between an outer surface of said cap and an inner surface of said upwardly extending ring, the width of said second gap being less than the width of said downwardly projecting peripheral ring.

* * * * *